United States Patent [19]

Matsui et al.

[11] Patent Number: 4,764,859
[45] Date of Patent: Aug. 16, 1988

[54] METHOD AND APPARATUS FOR CONTROLLING CIRCULATING-CURRENT TYPE CYCLOCONVERTER

[75] Inventors: Takayuki Matsui, Hitachi; Toshiaki Okuyama, Ibaraki, all of Japan

[73] Assignee: Hitachi, Ltd., Tokyo, Japan

[21] Appl. No.: 68,068

[22] Filed: Jun. 30, 1987

[30] Foreign Application Priority Data

Jun. 30, 1986 [JP] Japan .................................. 61-153453

[51] Int. Cl.⁴ .......................................... H02M 5/257
[52] U.S. Cl. .................................... 363/161; 363/164; 323/207
[58] Field of Search ...................... 363/8–10, 363/160, 161, 162, 164; 323/205, 207

[56] References Cited

U.S. PATENT DOCUMENTS 4,013,937 3/1977 Pelly et al. ........................ 363/161 X
4,303,972 12/1981 Stacey et al. ........................ 363/161

FOREIGN PATENT DOCUMENTS 0054868 3/1983 Japan .................................. 363/161
0053552 11/1985 Japan .

Primary Examiner—Peter S. Wong
Attorney, Agent, or Firm—Antonelli, Terry & Wands

[57] ABSTRACT

A current-circulating cycloconverter includes a positive converter and a negative converter connected in anti-parallel with each other through a DC reactor. A load is connected to an intermediate tap of the DC reactor. When a load current flowing to the load is smaller than a predetermined value, a circulating current flowing through the positive and negative converters is held at a minimum required value. A circulating current is caused to additively flow for canceling a voltage drop produced across the DC reactor when the load current exceeds the predetermined value.

4 Claims, 4 Drawing Sheets

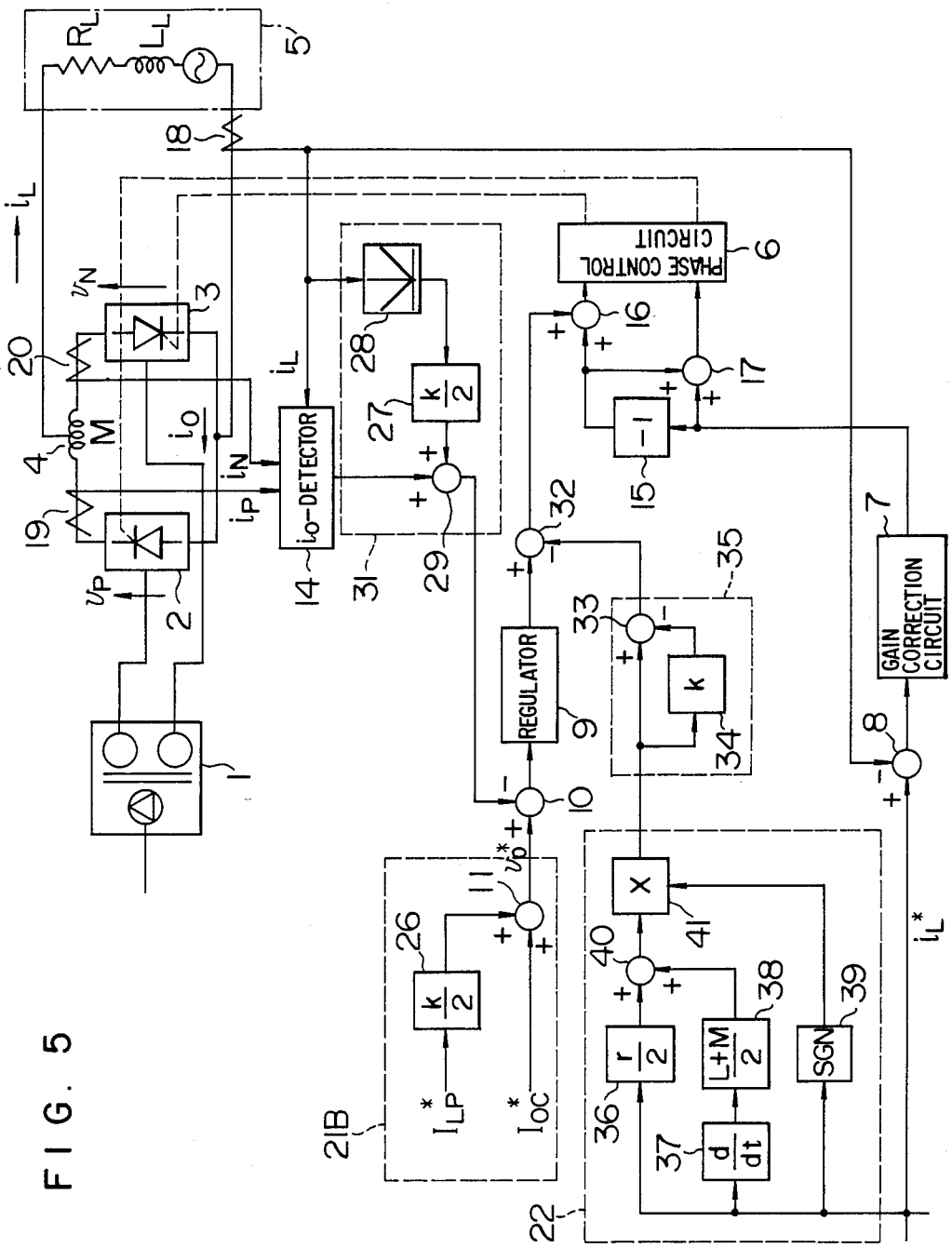
F I G. 5

4,764,859

METHOD AND APPARATUS FOR CONTROLLING CIRCULATING-CURRENT TYPE CYCLOCONVERTER

BACKGROUND OF THE INVENTION

The present invention relates to a cycloconverter for supplying an electric power of a variable frequency to an AC motor such as an induction motor or the like. More particularly, the invention is concerned with a method of controlling a circulating-current type cycloconverter in which a circulatory current circulates over and through a positive converter and a negative converter. The invention is also directed to an apparatus for controlling the circulating-current type cycloconverter.

As is known in the art, the cycloconverter is an apparatus for linking together AC input voltage waveforms to thereby produce an AC output voltage having a frequency which differs from that of the AC input voltage. Since the circulating-current type cycloconverter among others is capable of changing over in a continuous manner the conduction periods of thyristors provided at positive and negative banks, respectively, the output current waveform of this type cycloconverter can approximate a sinusoidal waveform, whereby unwanted torque ripple tending to occur at a low rotational speed of the motor constituting a load of the converter can be suppressed, to advantage. On the other hand, the circulating-current type cycloconverter suffers a disadvantage in that the source power factor is lowered because the whole circulating current constitutes a lagging reactive component.

As a hitherto known apparatus for compensating for the reactive component of the output power of the circulating-current type cycloconverter, there may be mentioned the one described in Japanese patent publication JP-B-53552. The reactive power control system disclosed in this publication is implemented in such an arrangement in which the circulating-currents of individual phases in a cycloconverter are so proportioned that the circulating current is reduced in the phase in which the load current has a great absolute value while the circulating current is increased in the phase of the load current having a smaller absolute value, to thereby control the reactive power through coordination with leading reactive components produced by phase advancing capacitors provided at the power receiving end without need for increasing significantly the capacity of the cycloconverter.

However, in the prior known reactive power control system, no consideration is paid to the control of the circulating current in the overload condition. Consequently, upon occurrence of overload condition, voltage drop appearing across a direct current (DC) reactor is increased, whereby insufficiency in the output voltage of the cycloconverter is involved to give rise to a problem that desired torque can not be obtained from the AC motor constituting the load. For solving this problem, it may occur to increase the source voltage of the cycloconverter to the level of the voltage required by the load in the overload condition (which voltage is equal to a sum of voltage drop across the DC reactor and the voltage supplied to the load). With such measures, however, the reactive component is increased in the light-load condition, causing the source power factor to be lowered undesirably. For absorbing the increased portion of the reactive component by means of the phase advancing capacitor provided at the power receiving end, it is necessary to increase the capacity of the phase advancing capacitor.

SUMMARY OF THE INVENTION

It is therefore an object of the present invention to provide a method and an apparatus for controlling a circulating-current type cycloconverter according to which the source voltage of the cycloconverter can be set to a voltage required by a load in the maximum overload condition without lowering the source power factor in the light load condition.

The object of the invention mentioned above can be accomplished by providing such an arrangement in which unless a sum of voltage drop produced across a DC reactor and a voltage supplied to a load (i.e. output voltage of the cycloconverter) exceeds a source voltage, a DC circulating current is maintained to be constant, while a circulating current effective to reduce the voltage drop produced across the DC reactor is additively produced when the aforementioned sum voltage exceeds the source voltage.

Thus, there is provided according to an aspect of the present invention a method of controlling a circulating-current type cycloconverter in which a positive converter and a negative converter are connected in antiparallel with each other by way of a DC reactor for supplying an AC power of a predetermined frequency to an apparatus or machine constituting a load, wherein when magnitude of a product of a load current flowing to the load and an angular frequency of the load current (i.e. maximum differential value of the load current) is smaller than a predetermined value, the circulating current flowing circulatively through the positive and negative converters is held steadily at a minimum level to thereby prevent the source power factor from being decreased in the light-load condition, while when the magnitude of product of the load current and the angular frequency thereof is greater than the predetermined value, a circulating current is caused to flow additively which current is effective to reduce the change in the number of interlinking magnetic flux of the DC reactor, to thereby reduce the voltage drop across the DC reactor and thus ensure the supply of a voltage required by the load.

For improving the source power factor, reduction in the circulating current is effective. However, when the circulating current is intermittently interrupted for this end, distortion will occur in the waveform of the output voltage and hence in the load current, providing a cause for the torque ripple in an AC motor constituting the load. Thus, it is preferred to maintain the circulating current at a minimum constant level. On the other hand, the DC reactor brings about a voltage drop thereacross due to the load current, wherein the magnitude of the voltage drop depends proportionally on the magnitude of the load current and the angular frequency thereof.

Under the circumstances, the circulating current is maintained minimum at a substantially constant value unless the output voltage exceeds the source voltage, and otherwise a circulating current is caused to flow additively in the sense to suppress the change in the interlinkage magnetic flux of the DC reactor to thereby reduce the voltage drop across the DC reactor and ensure the supply of sufficient voltage to the load. In this manner, the source voltage of the cycloconverter can be set at the voltage required by the load in the overload condition without degrading the source power factor in the light-load condition.

BRIEF DESCRIPTION OF THE DRAWINGS

FIG. 5 is a view showing in a block diagram an arrangement of the circulating-current type cycloconverter controlling apparatus according to another embodiment of the present invention.

DESCRIPTION OF THE PREFERRED EMBODIMENTS

Now, the present invention will be described in detail in conjunction with exemplary or illustrative embodiments thereof by reference to the drawings.

General Description

Figure 1:
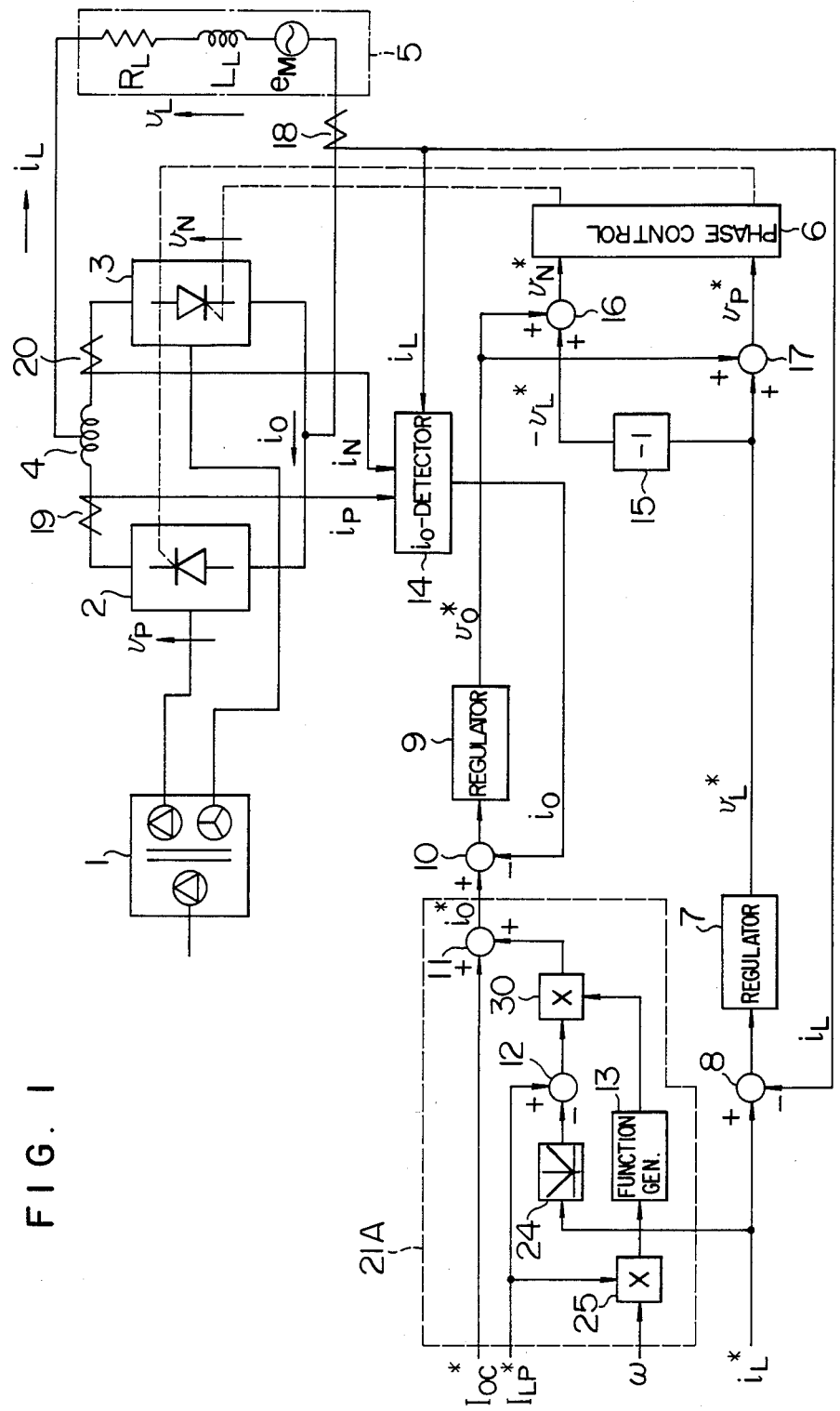
FIG. 1 is a view showing in a block diagram an arrangement of a circulating-current type cycloconverter controlling apparatus according to an exemplary embodiment of the present invention.

FIG. 1 shows an arrangement of a circulating-current type cycloconverter and a control apparatus therefor.

The circulating-current type cycloconverter includes a positive converter (i.e. positive bank of thyristors) 2, a negative converter (i.e. negative bank of thyristors) 3 and a DC reactor 4 with an intermediate tap, wherein both the positive and the negative converters 2 and 3 are connected to a power source transformer 1. In connection with FIG. 1, it should be noted that the positive and the negative converters 2 and 3 are shown only for one phase and that an AC motor connected to the intermediate tap of the DC reactor 4 for one phase is shown in the form of an equivalent circuit 5. The output voltages $v_P$ and $v_N$ of the positive and negative converters 2 and 3, respectively, can be varied by a gate pulse signal produced by a phase control circuit 6. An adder 8 has the inputs supplied with a load current command $i_L^*$ and a load-current detection signal $i_L$, respectively, wherein the latter is produced by a load current detector 18 and supplied to the adder 8 as a feedback signal. The difference between the load current signal $i_L^*$ and the detection signal $i_L$ is amplified by a regulator 7 to be produced as a command signal $v_L^*$ indicating a voltage required by the load constituted by the AC motor 5. There is further provided an adder 10 which is supplied with a circulating current command $L_O^*$ and a circulating-current detection signal $i_O$ which is produced by a circulating current detecting circuit 14 and supplied to the adder 10 as a feedback signal. Difference between these input signals $i_O^*$ and $i_O$ is amplified by a regulator 9 to be outputted as a voltage command $v_O^*$. The circulating-current detection signal $i_O$ is arithmetically determined by the circulating-current detection circuit 14 on the basis of a current detection signal $i_P$ produced by a converter output current detector 19 provided in association with the positive converter 2, a current detection signal $i_N$ produced by a converter output current detector 20 associated with the negative converter 3 and the load current detection signal $i_L$ produced by the load current detector 18 in accordance with the following equation:

$$i_O = \frac{1}{2}\{(i_P + i_N) - |i_L|\} \quad (1)$$

The output voltage commands $v_P^*$ and $v_N^*$ for the positive and negative converters 2 and 3, respectively, which are inputted to the phase control circuit 6 are prepared by adders 16 and 17 and an inverter circuit 15 through arithmetic operation of the signals $v_L^*$ and $v_O^*$ in accordance with $$v_P^* = v_L^* + v_O^* \quad (2)$$

$$v_N^* = -v_L^* + v_O^* \quad (3)$$

When ratios of the output voltages $v_P$ and $v_N$ of the positive and negative converters to the command voltages $v_P^*$ and $v_N^*$ are represented by $K_P$ and $K_N$, respectively, the ratios $K_P$ and $K_N$ can satisfy the following relation:

$$K_P = -K_N \quad (4)$$

By rearranging the relations mentioned above, the relations between the quantities $v_P$, $v_N$ and $v_L^*$, $v_O^*$ are given by $$v_L^* = \frac{v_P + v_N}{2 \cdot K_P} \quad (5)$$

$$v_O^* = \frac{v_P - v_N}{2 \cdot K_P} \quad (6)$$

The circuit arrangement as well as the arithmetic operations described above so far is also applicable to the circulating-current type cycloconverter system known heretofore.

DETAILED DESCRIPTION OF FIRST EMBODIMENT

The voltage command $v_O^*$ required for the circulating-current flow and the voltage command $v_L^*$ required for the load current flow in carrying out the invention can be determined in the manner mentioned below.

Now, it is assumed that the output voltages of the positive and negative converters 2 and 3 are represented by $v_P$ and $v_N$ with the output currents being represented by $i_P$ and $i_N$, respectively, a terminal voltage (corresponding to the phase voltage) of the AC motor constituting the load 5 is represented by $v_L$, the internal resistance of the AC motor is by $R_L$, inductance thereof is by $L_L$, the voltage equivalent to the counter electromotive force of the motor is by $e_M$, the load current thereof is by $i_L$, the resistance of the DC reactor is by r with self-inductance and mutual inductance being represented by L and M, respectively, and differential operator d/dt is by p, and that the polarities of the voltages and currents are such as indicated by the attached arrows shown in FIG. 1. Under the conditions, the voltages $v_P$, $v_N$ and $v_L$ are given by the following equation:

$$v_P = (r+pL)\cdot i_P + pM\cdot i_N + v_L \quad (7)$$

$$v_N = -pM\cdot i_P - (r+pL)\cdot i_N + v_L \quad (8)$$

$$v_L = (R_L + pL_L)\cdot i_L + e_M \quad (9)$$

When considering the polarities of the load current $i_L$, the converter output currents $i_P$ and $i_N$ are given as follows:

In the case $i_L \geqq 0$, $$i_P = i_L + i_O, \text{ and } i_N = i_O \quad (10)$$

In the case $i_L < 0$, $$i_P = i_O, \text{ and } i_N = -i_L + i_O \quad (11)$$

Thus, from the expression (10) and (11), $$i_P - i_N = i_L$$

$$i_P + i_N = |i_L| + 2\cdot i_O \quad (12)$$

In consideration of the expressions (7), (8) and (12), the expressions (5) and (6) can be rewritten as follows:

$$K_P \cdot v_L^* = \tfrac{1}{2}(v_P + v_N) \quad (13)$$

$$= \tfrac{1}{2}\{r + p(L-M)\}\cdot i_L + v_L$$

$$K_P \cdot v_O^* = \tfrac{1}{2}(v_P - v_N) \quad (14)$$

$$= \tfrac{1}{2}\{r + p(L+M)\}\{|i_L| + 2\cdot i_O\}$$

As will be seen from the expression (13), the load current $i_L$ can be controlled by the load voltage command $v_L^*$. In this connection, when the self-inductance L and the mutual inductance M of the DC reactor 4 are such that L=M, then, $K_P\cdot v_L^* \approx v_L$ applies valid, since $\tfrac{1}{2}\cdot r\cdot i_L << v_L$. On the other hand, the voltage command $v_O^*$ required for the circulating current $i_O$ to flow is determined by the differential value of the absolute value of the load current $i_L$ and the differential value of the circulating current $i_O$.

Figure 2A:
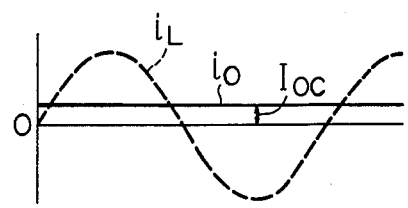
FIGS. 2A to 2C are views for illustrating waveforms of a circulating current controlled according to the teachings of the invention.
Figure 2B:
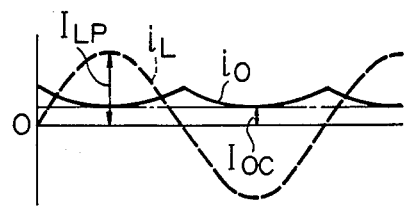
Figure 2C:
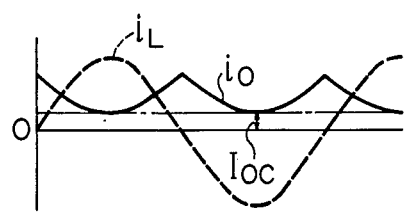

In this connection, it is taught according to the present invention that a circulatory current $I_{OC}$ of a flat form illustrated in FIG. 2A is caused to circulate when the product of magnitude of the load current and the angular frequency thereof is not greater than a predetermined value, while circulating currents $i_O$ of waveforms shown in FIGS. 2B and 2C, respectively, are caused to flow in dependence on the magnitude of the abovementioned product when the latter exceeds the predetermined value mentioned above. Accordingly, the circulating current command $i_O^*$ produced by the circulating-current command circuit 21A of the system according to the embodiment under consideration is determined so as to satisfy the condition given by $$i_O^* = \tfrac{k}{2}(I_{LP}^* - |i_L^*|) + I_{OC}^* \quad (15)$$

where $I_{LP}^*$ represents a peck value of the load current command, $I_{OC}^*$ represents a flat circulating-current command value, and k represents a coefficient or factor corresponding to the product of the load current and the angular frequency thereof. To this end, the circulating current command circuit 21A includes a multiplier 25 for determining the product of $I_{LP}^*$ and the angular frequency $\omega$ and a function generator 13 for generating the coefficient k in accordance with the magnitude of the product, the coefficient signal k being applied to one input of a multiplier 30. The load current command peak $I_{LP}^*$ is added with the output signal from an absolute value circuit 24 by means of an adder 12, the resulting sum being applied to the other input of the multiplier 30. Thus, the arithmetic operation corresponding to the first term of the right hand side of the expression (15) is realized. The output of the multiplier 30 is applied to an adder 11.

The voltage $v_S$ required by the load in the overload condition is given by $$v_S = \sqrt{(r + R_L)^2 + (\omega_{max}\cdot L_L)^2}\cdot I_{Lmax} + r\cdot I_{OC} + e_M \quad (16)$$

where $I_{Lmax}$ represents the maximum value of the angular frequency thereof.

On the other hand, in the case of the flat circulating current flow illustrated in FIG. 2A, a voltage drop is produced across the DC reactor due to the load current. Accordingly, in that case, the output voltage $v_{PI}$ of the cycloconverter is given by $$v_{PI} = \sqrt{(r + R_L)^2 + \omega^2(L_L + L)^2}\cdot I_L + r\cdot I_{OC} + e_M \quad (17)$$

Figure 3:
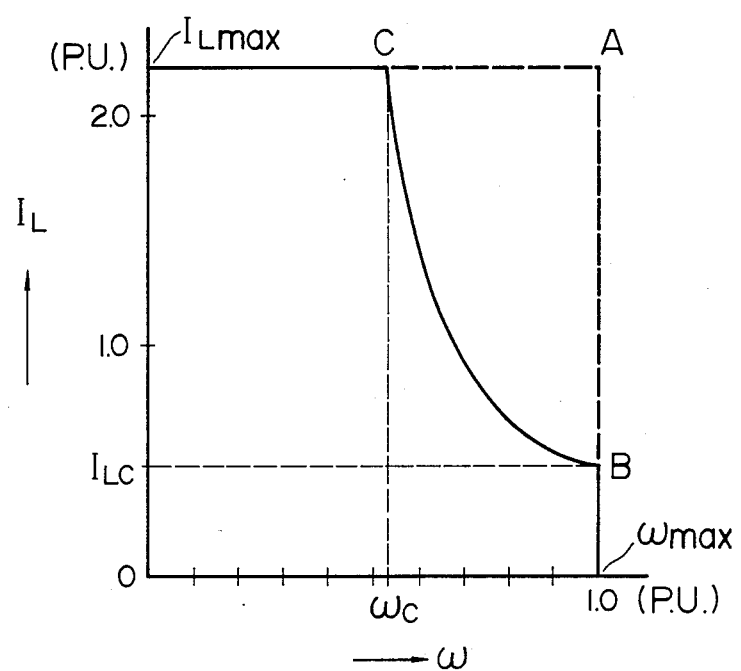
FIG. 3 is a view for graphically illustrating a range of magnitude of a load current and angular frequency thereof to which the invention is applied.
Figure 4:
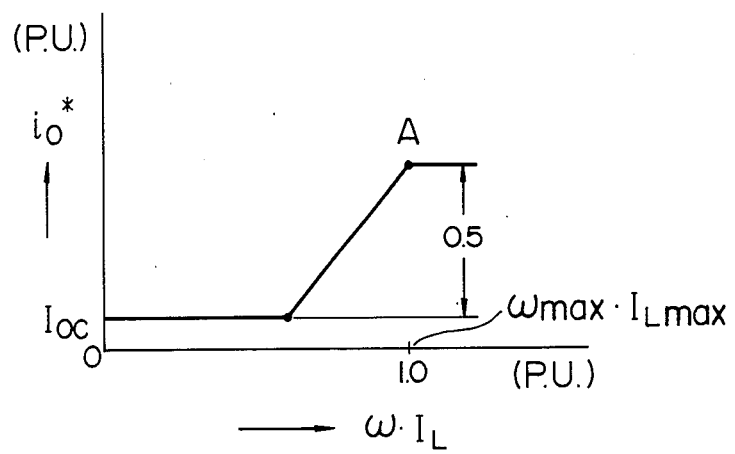
FIG. 4 is a view for graphically illustrating a relationship of magnitude of a circulating current command to that of a product of the magnitude of the load current and the angular frequency thereof.

Referring to FIG. 3, there are illustrated ranges of the load current and the angular frequency thereof to which the circulating currents of three modes illustrated in FIGS. 2A, 2B and 2C can be applied. More specifically, the flat circulating current illustrated in FIG. 2A is allowed to flow in the range enclosed by a boundary following a parth "O→$I_{Lmax}$→C→B→$\omega_{max}$" shown in FIG. 3, while the circulating current mode illustrated in FIG. 2C corresponds to the point A shown in FIG. 3, and the range enclosed by the boundary following a parth "A→C→B" corresponds to the circulating current mode illustrated in FIG. 2B. On the assumption that the resistances of the DC reactor and the load are sufficiently small when compared with the magnitude of reactance, the relation represented by the boundary curve C-B between the modes illustrated in FIGS. 2A and 2B can be determined from the expressions (16) and (17) as follows:

$$\omega\cdot I_L = \frac{L_L}{L_L + L}\cdot \omega_{max}\cdot I_{Lmax} \quad (18)$$

Accordingly, it is assumed in the case of the embodiment under consideration that the magnitude of the coefficient k of the circulating current command $i_O^*$ given by the expression (15) is caused to vary in dependence on the product of magnitude of the load current $I_L$ and the angular frequency $\omega$ (i.e. the maximum differential value of the load current) as follows:

When $\omega\cdot I_L \leqq (\omega\cdot I_L)_c$, $\quad (19)$ $$k = 0$$

When $\omega\cdot I_L \geqq \omega_{max}\cdot I_{Lmax}$, $\quad (20)$ $$k = 1$$

When $\omega_{max}\cdot I_{Lmax} > \omega\cdot I_L > (\omega\cdot I_L)_c$, $\quad (21)$ -continued $$k = \frac{\omega \cdot I_L - (\omega \cdot I_L)_c}{\omega_{max} \cdot I_{Lmax} - (\omega \cdot I_L)_c}$$

where $(\omega \cdot I_L)_c = \{L_L/(L_L + L)\} \cdot \omega_{max} \cdot I_{max}$.

DETAILED DESCRIPTION OF SECOND EMBODIMENT

In conjunction with the first embodiment described above, it will be noted that it is necessary to be capable of changing over smoothly the three modes one another, i.e. the flat circulating current mode illustrated in FIG. 2A, the circulating current mode illustrated in FIG. 2B and that illustrated in FIG. 3C. It is further noted that the circulating currents illustrated in FIGS. 2B and 2C are of waveforms each including an AC component. As will be seen in these figures, the frequency of the convex waveform is double that of the load current $i_L$ with the result that the circulating current of the convex waveform is difficult to flow as desired with the hitherto known circulating current control system (ACR system) due to delay involved in the response of this system. More specifically, when the load current is of a high frequency, the control system output may assume the reverse polarity due to the delay in response. In the worst case, even the peak value of the circulating current would be amplified to such extent that an overcurrent level is detected.

With the second embodiment of the present invention which is directed to a solution of the abovementioned problem, the converter voltage required for the circulating current to flow is considered in terms of separated DC and AC components, wherein the DC component voltage is derived from the output of a current control circuit while the AC component voltage is obtained from a circuit 22 for compensating for the voltage drop across the DC reactor.

An illustrative arrangement according to the second embodiment of the invention is shown in FIG. 5, wherein like parts or elements as those shown in FIG. 1 are denoted by same reference symbols. Difference of the second embodiment from the first one can be seen in that a circulating current command circuit 21B includes a proportional gain circuitry 26 for multiplying the command $I_{LP}^*$ for the load current peak value with a predetermined gain and an adder 11 for adding the output of the proportional gain circuitry 26 with the command $I_{OC}^*$ for the flat circulating current, wherein the adder 11 is adapted to output steadily a DC signal. The adder 10 is supplied with the output signal of an arithmetic feedback signal circuit 31 which determines arithmetically the DC component of the circulating current. On the other hand, with regard to the AC component command for the circulating current, the output signal of the voltage drop compensating circuit 22 for compensating for the voltage drop produced across the DC reactor 4 is inputted to a gain correction circuit 35 to be arithmetically processed, the output of the circuit 35 being then applied to an adder 32 to be added together with the output of a regulator 9.

The arithmetic feedback signal circuit 31 includes an absolute value circuitry 28 for producing the absolute value signal from the detection output signal of the load current detector 18, a proportional gain circuitry 27 for multiplying the output signal of the absolute value circuitry 28 with a predetermined gain, and an adder 29 for adding the output signal of the proportional gain circuitry 27 with the detection signal of the circulating current detector 14.

In the DC reactor voltage drop compensating circuit 22, the load current command $i_L^*$ is inputted to the proportional gain circuitry 36, a differentiating circuitry 37 and a polarity detecting circuitry 39, wherein the output signal of the differentiating circuit 37 is inputted to the proportional gain circuitry 38 to thereby determine arithmetically a reactance voltage drop produced across the DC reactor 4 due to the load current. The output of the proportional gain circuitry 38 is applied to an adder 40 to be added with the output of a proportional gain circuitry 36 for arithmetically determining a resistance voltage drop produced across the DC reactor, the output of the adder 40 being then multiplied the output signal of the polarity detector 39 by a multiplier 41.

Next, description will be made on the principle of operation of the control apparatus according to the second embodiment of the present invention. Assuming that the circulating current is produced in accordance with the expression (15), the voltage command $v_O^*$ required for the circulating current to flow is given from the expressions (14) and (15) as follows:

$$K_P \cdot v_O^* = \frac{1}{2} \{r + p(L + M)\} \cdot (1 - k) \times |i_L^*| + \quad (22)$$

$$r \cdot \left(\frac{k}{2} \cdot I_{LP}^* + I_{OC}^*\right)$$

The first term of the expression (22) represents the differential value of the load current command $i_L^*$ (AC current) multiplied with the coefficient $(1-k)$ and corresponds to the voltage command for the AC component, and the second term represents the signal of magnitude proportional to that of the load current signal and defines the value of DC voltage drop (i.e. the voltage command for the DC component).

As will be appreciated, according to the second embodiment of the invention, the AC component voltage command given by the first term of the expression (22) is derived through multiplication of the output signal from the DC reactor voltage drop compensating circuit 22 with the coefficient $(1-k)$ by a correcting circuit 35, while the DC component voltage command defined by the second term of the expression (22) is obtained as the output signal of the circulating current regulator 9. Under the conditions, the current command value produced by the circulating current command circuit 21 and the feedback quantity thereof are arithmetically determined by the arithmetic feedback circuit 31 in accordance with $$\text{Current Command and Value} = \frac{1}{2} \cdot k \cdot I_{LP}^* + I_{OC}^* \quad (23)$$

$$\text{Feedback Quantity} = i_O + \frac{1}{2} \cdot k \cdot |i_L| \quad (24)$$

Figure 6:
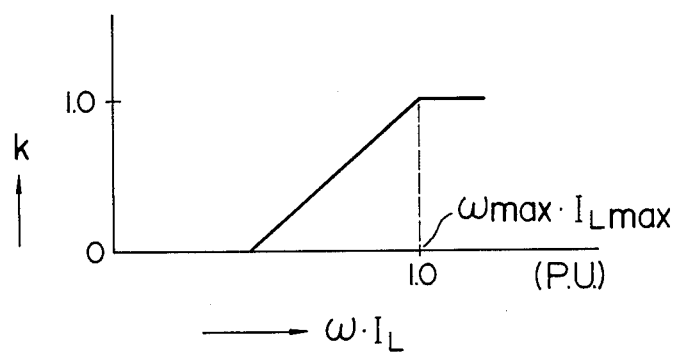
FIG. 6 is a view for graphically illustrating a relationship existing between a coefficient k and magnitude of the product of the load current and the angular frequency thereof.

According to the procedure described above, the input signal to the circulating current control circuit is constituted by the DC component and thus independent of the angular frequency of the load current whether the circulating current is in any one of the modes illustrated in FIG. 2A, FIG. 2B or FIG. 2C, which in turn means that the frequency of the load current can be made independent of the delay involved in the response of the circulating current control system (ACR system), whereby the problem mentioned hereinbefore can be solved satisfactorily. Besides, by determining the coefficient k in accordance with the product of the magnitude of load current and the angular frequency thereof, as is illustrated in FIG. 6, the command for the circulating current control circuit, the feedback quantity and the gain of the DC reactor voltage drop compensating circuit 22 can be made variable simultaneously, whereby the smooth change-over of the control modes can be accomplished.

In the foregoing, the preferred embodiments of the invention have been described on the assumption that the respective control systems are implemented in the form of analogue circuit configuration for the purpose of facilitating the understanding of the invention. It should however be appreciated that the invention may also be realized in the form of a digital control system employing a microprocessor. Further, although it has been assumed that the coefficient k is varied in dependence on magnitude of the product of the load current and the angular angle thereof, it should be appreciated that the similar effects can be attained even when the coefficient k is varied in dependence only on the magnitude of the load current if the change in the angular frequency is insignificant.

As will now be appreciated from the foregoing description, it is possible according to the present invention to prevent the voltage drop across the DC reactor from being increased in the overload condition without lowering the source power factor in the light-load condition, whereby the source voltage can be decreased to the voltage required by the load in the overload condition.

We claim:

1. A method of controlling a circulating-current type cycloconverter in which a positive converter and a negative converter are connected in anti-parallel with each other through a DC converter for supplying an AC power of a predetermined frequency to a load, comprising the steps of holding a circulating current circulating through said positive converter and said negative converter at a minimum required level when a load current flowing to said load is lower than a predetermined value, and causing a circulating current for canceling a voltage drop produced across said DC reactor to flow when said load current exceeds said predetermined value.

2. A method according to claim 1, wherein said step of causing a circulating current to flow for canceling causes the circulating current to flow additively.

3. A circulating-current type cycloconverter control system, comprising:
a converter circuit including a positive converter and a negative converter connected in anti-parallel with each other through a DC reactor;
a load supplied with an electric power from said converter circuit;
load voltage command means for producing a signal commanding a voltage supplied to said load;
circulating current command means for producing a signal commanding magnitude of a circulating current circulating through said positive and negative converters;
arithmetic circulation voltage determining means for arithmetically determining on the basis of said circulating current commanding signal a voltage required for said circulating current to flow; and
phase control means for performing firing phase control of said positive and negative converters on the basis of a sum of the signal produced by said arithmetic circulation voltage determining means and said load voltage commanding signal;
wherein said circulating current commanding means is operative to determine the magnitude of said circulating current command signal so that change in the current flowing through said DC reactor is reduced when a product of magnitude of said load current and an angular frequency thereof exceeds a predetermined magnitude.

4. A circulating-current type cycloconverter control system, comprising:
a converter circuit including a positive converter and a negative converter connected in anti-parallel with each other through a DC reactor;
a load supplied with an electric power from said converter circuit;
load voltage command means for producing a signal commanding a voltage supplied to said load;
circulating current command means for commanding magnitude of a circulating current circulating through said positive and negative converters;
arithmetic circulation voltage determining means for arithmetically determining on the basis of said circulating current commanding signal a voltage required for said circulating current to flow;
arithmetic means for arithmetically determining magnitude of a voltage drop produced across said DC reactor due to the load current;
circulation voltage commanding means for adding together the signal output of said voltage drop determining means and the signal output of said arithmetic circulation voltage determining means; and
phase control means for performing firing phase control of said positive and negative converters on the basis of a sum of the signal produced by said arithmetic circulation voltage determining means and said load voltage commanding signal;
wherein when a product of magnitude of said load current and an angular frequency thereof exceeds a predetermined magnitude, said circulation voltage commanding means is operative to add to the signal output of said circulation voltage determining means a quantity corresponding to said signal of said DC reactor voltage drop determining means multiplied with a gain which is decreased as said product is increased.

* * * * *